United States Patent
Takahashi

(10) Patent No.: US 6,190,763 B1
(45) Date of Patent: Feb. 20, 2001

(54) MAGNETOOPTIC THIN FILM, MAGNETOOPIC RECORD MEDIUM

(76) Inventor: Migaku Takahashi, 20-2, Hitokida 2-chome, Taihaku-ku, Sendai-shi, Miyagi-ken 980 (JP)

(*) Notice: Under 35 U.S.C. 154(b), the term of this patent shall be extended for 0 days.

(21) Appl. No.: 08/793,871

(22) PCT Filed: Sep. 6, 1994

(86) PCT No.: PCT/JP94/01470

§ 371 Date: Apr. 15, 1997

§ 102(e) Date: Apr. 15, 1997

(87) PCT Pub. No.: WO96/08008

PCT Pub. Date: Mar. 14, 1996

(51) Int. Cl.[7] .................................................. G11B 5/66
(52) U.S. Cl. ................... 428/332; 428/336; 428/694 ML; 428/694 SC; 428/694 MT; 428/900; 427/128; 427/129; 427/130; 369/13; 369/283; 204/192.2
(58) Field of Search ..................... 428/694 ML, 694 SC, 428/694 MT, 900, 332, 336; 427/128–130; 204/192.2; 363/13, 283

(56) References Cited

FOREIGN PATENT DOCUMENTS

| | | |
|---|---|---|
| 59-63041 | 4/1984 | (JP) . |
| 60-191451 | 9/1985 | (JP) . |
| 61-75511 * | 4/1986 | (JP) . |
| 61-77316 * | 4/1986 | (JP) . |
| 61-115317 * | 6/1986 | (JP) . |
| 61-258387 * | 11/1986 | (JP) . |
| 62-97155 | 5/1987 | (JP) . |
| 62-124642 * | 6/1987 | (JP) . |
| 62-124643 * | 6/1987 | (JP) . |
| 176550A * | 3/1989 | (JP) . |
| 64-76550 | 3/1989 | (JP) . |
| 1-118238 * | 5/1989 | (JP) . |
| 1-229441 | 9/1989 | (JP) . |
| 3-162736 | 7/1991 | (JP) . |

OTHER PUBLICATIONS

Migaku Takahashi, et al., *Giant Magnetic Kerr Rotation for MnSbPt Films with NiAs Structure*, Nov. 1994, pp. 5–14.

* cited by examiner

*Primary Examiner*—Leszek Kiliman
(74) *Attorney, Agent, or Firm*—Randall J. Knuth

(57) ABSTRACT

This invention aims at providing magnetooptic thin film having a high Kerr rotation angle ($\theta_k$) in a short wave band, etc., magnetooptic recording medium and a method of providing them. The magnetooptic thin film has an alloy composition is $Mn_xSb_yPt_z$, $45 \leq x \leq 56$, $40 \leq y \leq 48$, $2 \leq z \leq 15$ and $x+y+z=100$ (where x, y and z are proportions in atomic %), and a ratio $\alpha/\beta$ of a diffraction intensity from a (220)-plane of a $C_{1b}$ type crystalline structure of the magnetooptic thin film in X-ray diffraction intensity $\beta$ from a (110)-plane of a $B8_1$ type crystalline structure in from 0.05 to 1.0. The film thickness of the magnetooptic thin film is from 10 nm to 300 nm. The production method of the magnetooptic thin film is characterized in that the substrate, on which the magnetooptic thin film is to be formed, is heat-treated on a vacuum at most $5 \times 10^{-6}$ Torr at a temperature not lower than 100° C. for at least 30 minutes before the thin film is formed.

21 Claims, 7 Drawing Sheets

MAGNETOOPTIC THIN FILM, MAGNETOOPIC RECORD MEDIUM

BACKGROUND OF THE INVENTION

1. Field of the Invention

The present invention relates to a magnetooptic thin film, a magnetooptic record medium and a method of producing them. More particurarly, the present invention relates to a magnetooptic thin film and a method of producing magnetooptic thin film useful in a record layer of a magnetooptic record medium or the like. Especially, a magnetooptic thin film according to the present invention is provided with a high Kerr rotation angle ($\theta_k$) in a short wavelength band and a large magnetic anisotropy and can decrease an internal stress even with a thin film thickness range. The present invention is preferably applicable to a record layer or the like for achieving a high record density by using a short wavelength light.

2. Description of the Related Art

In recent years, a magnetooptic record medium has been reduced to practice as a record medium having a high density and a large capacity. Especially, the application field thereof shows a further widening tendency since record information can repeatedly be recorded and reproduced. In accordance therewith, development of a magnetooptic record medium having a higher record density is desired.

According to a current magnetooptic record system, a laser beam having a wavelength of, for example, 830 nm or 780 nm is mainly used. However, a laser beam having a shorter wavelength is effective to realize a magnetooptic record system having a higher record density. The reason is that a beam spot diameter (a diameter of a portion on the surface of a substrate of a medium where a laser beam is condensed) can be decreased in accordance with the shortening of the oscillation wavelength of a laser. As a result, it is known that a pit diameter (minimum record unit of information on a medium) can be downsized and accordingly, the laser beam having a short wavelength is directly connected to promotion of a plane record density. Therefore, it is conceived in a future magnetooptic record system to utilize a laser beam having a short wavelength of 500 through 650 nm that is far shorter than the wavelength currently used. Therefore, a record layer having an excellent magnetooptic characteristic in the short wavelength band is needed as a medium for use in the future magnetooptic record systems.

Currently, for example, a thin film made of a rare earth transitional metal amorphous alloy, represented by a TbFeCo alloy provided with an axis of easy magnetization in a direction vertical to a film face and excellent in the vertical magnetic anisotropy, is frequently used as a record layer material of a magnetooptic record medium on sale. However, the effective magnetooptic characteristics cannot be attained in the above-described short wavelength range by these record layer materials.

As a measure for resolving the problem, an intensive study is being carried out currently in respect of, for example, a structure alternately laminated with thin films made of platinum (Pt) and thin films made of cobalt (Co), that is, a Co/Pt multilayered film or the like. Although such a multilayered film is certainly provided with a Kerr rotation angle to some degree in a short wavelength band, the value ranges from 0.2 to 0.3 degree and therefore, an increase in the Kerr rotation angle has been desired to obtain a high signal to noise ratio (S/N ratio) as the record layer material of the magnetooptic record medium.

Further, in another solution, a Whistler alloy comprising Pt, Mn and Sb (Pt:Mn:Sb=1:1:1 in atomic %) having a crystalline structure of a $C_{1b}$ formed by a vapor deposition process or a sputtering process is publicly-known (P. G. van Engen et al., Appl. Phys. Lett., 42, 202 (1983)). The PtMnSb whistler alloy film is provided with an excellent characteristic in view of the Kerr rotation angle. However, the PtMnSb whistler alloy film having a crystalline structure of a $C_{1b}$ type has a drawback where the magnetic anisotropy is small, that is, the saturation magnetization in a direction vertical to the film face is small. This signifies that the alloy cannot be provided with a function necessary as a record layer material of a magnetooptic record medium, that is, an axis of easy magnetization in a direction vertical to the film face (excellent in the vertical magnetic anisotropy). Accordingly, an improvement is needed since recorded information therefore becomes unstable. Meanwhile, a PtMnSb alloy having a crystalline structure and a composition other than those of the Whistler alloy, has almost no magnetooptic characteristic. As described above, the conventional PtMnSb alloy film is insufficient in view of the function as a record layer material of a magnetooptic record medium.

Meanwhile, there has been a report where it has been confirmed that $\theta_k > 1$ degree when a laser beam having a wavelength of 500 nm is irradiated on such a MnSbPt alloy film which has a composition near to $Mn_{50}Sb_{44}Pt_6$ (by atomic %) and a crystalline structure which comprises two phases of a $C_{1b}$ type and a $B8_1$ type and the film thickness of which is 500 nm (Migaku Takahashi et al., J. Magn. Magn. Mater. 131(1994) 67–75). However, a noble metal of platinum is included in such an alloy film and therefore, it is one of necessary conditions for fabricating a magnetooptic record medium at a low cost to provide an inexpensive medium, to realize a high $\theta_k$ with a thin film thickness. Further, in the case of a sputtered film, stresses are generally liable to cause, with the film thickness of 50 nm or less, the adherence thereof with a substrate or a protective film which is unstable, and which is devoid of long period reliability, that is not preferable. Accordingly, it has been desired to establish film forming conditions capable of realizing a high $\theta_k$ with a thin film thickness and where internal stresses are small.

It is an object of present invention to provide a magnetooptic thin film which is comprised by a film thickness of less than 500 nm, which has a Kerr rotation angle ($\theta_k$) in a short wavelength band of 650 nm or less, a large saturation magnetization in a direction orthogonal to the film face and small internal stresses, a magnetooptic record medium and a method of producing them.

DISCLOSURE Of THE INVENTION

According to a magnetooptic thin film of the present invention, there is provided a magnetooptic thin film characterized in that in a magnetooptic thin film which is a ternary alloy comprising manganese (Mn), antimony (Sb) and platinum (Pt) an alloy composition of the magnetooptic thin film is $Mn_xSb_yPt_z$ where x, y and z are specified as $45 \leq x \leq 56$, $40 \leq y \leq 48$, $2 \leq z \leq 15$ and $x+y+z=100$ (x, y and z designate proportions by atomic %) and a ratio $\alpha/\beta$ of a diffraction intensity $\alpha$ from a (220)-plane of a $C_{1b}$ type crystalline structure to a diffraction intensity $\beta$ from a (110)-plane of a $B8_1$ type crystalline structure in X-ray diffraction of the magnetooptic thin film, is 0.05 or more and 1.0 or less.

Further, according to another aspect of the present invention, there is provided a magnetooptic thin film characterized in that in a magnetooptic thin film which is a ternary alloy of manganese (Mn), antimony (Sb) and platinum (Pt) an alloy composition of the magnetooptic thin film is $Mn_xSb_yPt_z$ where x, y and z are specified by $45 \leq x \leq 56$, $40 \leq y \leq 48$, $2 \leq z \leq 15$ and $x+y+z=100$ (x, y and z designate proportions by atomic %), and the film thickness of the magnetooptic thin film is 10 nm or more and less than 300 nm.

OPERATION OF THE INVENTION

According to the present invention, the Kerr rotation angle ($\theta_k$) becomes 0.4 deg. or more in a short wavelength band of 650 nm or less by constituting the alloy composition of the magnetooptic thin film as $Mn_xSb_yPt_z$ where x, y and z are specified by $45 \leq x \leq 56$, $40 \leq y \leq 48$, $2 \leq z \leq 15$ and $x+y+z=100$ (x, y and z designate proportions by atomic %). Further, the magnetooptic thin film having the saturation magnetization in the direction orthogonal to the film face of 60 emu/g or more (a value higher than that of the conventional Whistler alloy film (<50 emu/g) by 20% or more) and $\theta_k$ of 0.4 deg. or more attained when the wavelength is 528 nm, is provided by specifying a ratio $\alpha/\beta$ of the diffraction intensity $\alpha$ from the (220)-plane of the $C_{1b}$ type crystalline structure to the diffraction intensity $\beta$ from the (110)-plane of the $B8_1$ type crystalline structure in X-ray diffraction of the magnetooptic thin film, to 0.05 or more and 1.0 or less. Accordingly, the stability of recorded information is improved.

According to the present invention, the Kerr rotation angle ($\theta_k$) becomes 0.4 deg. or more in a shorter wavelength of 600 nm or less by constituting the alloy composition of the magnetooptic thin film as $Mn_xSb_yPt_z$ where x, y and z are specified by $45 \leq x \leq 55$, $42 \leq y \leq 45$, $3 \leq z \leq 10$ and $x+y+z=100$ (x, y and z designate proportions by atomic %). Therefore, the stable magnetooptic recording can be realized at a wavelength shorter than that recited in claim 1.

According to the present invention, the Kerr rotation angle ($\theta_k$) becomes 0.6 deg. or more at a shorter wavelength of 600 nm or less by constituting the alloy composition of the magnetooptic thin film as $Mn_xSb_yPt_z$ where x, y and z are specified by $48 \leq x \leq 53$, $42 \leq y \leq 45$, $4 \leq z \leq 8$ and $x+y+z=100$ (x, y and z designate proportions by atomic %). Accordingly, the magnetooptic thin film having a signal to noise ratio (S/N ratio) higher than those of the material recited in claim 1 and claim 2 can be achieved.

According to the present invention, the magnetooptic thin film having the saturation magnetization in the direction vertical to the film thickness of 75 emu/g or more (a value higher than that of the conventional whistler alloy film (<50 emu/g) by 50% or more) and $\theta_k$ of 0.8 deg. or more attained when the wavelength is 528 nm, is provided by specifying the ratio $\alpha/\beta$ of the diffraction intensity $\alpha$ from the (220)-plane of the $C_{1b}$ type crystalline structure to the diffraction intensity $\beta$ from the (110)-plane of the $B8_1$ type crystalline structure in X-ray diffraction of the magnetooptic thin film1 to 0.1 or more and 0.55 or less. Accordingly, the stability of recorded information is significantly improved.

According to the present invention, the Kerr rotation angle ($\theta_k$) becomes 0.4 deg. or more in a short wavelength band of 650 nm or less by constituting the alloy composition of the magnetooptic thin film as $Mn_xSb_yPt_z$ where x, y and z are specified by $45 \leq x \leq 56$, $40 \leq y \leq 48$, $2 \leq z \leq 15$ and $x+y+z=100$ (x, y and z designate proportions by atomic %). Therefore, the magnetooptic thin film having a high signal to noise ratio (S/N ratio) is provided. Further, the internal stress of the magnetooptic thin film can be restrained to $5 \times 10^{-6}$ dyn/cm$^2$ or less and a wavelength $\lambda(\theta_k^{max})$ providing the maximum value of the Kerr rotation angle can be reduced to 650 nm or less by specifying the film thickness of the magnetooptic thin film to 10 nm or more and less than 300 nm. Therefore, the magnetooptic thin film having long period reliability and capable of dealing with short wavelength recording can be obtained.

According to the present invention, the Kerr rotation angle ($\theta_k$) becomes 0.4 deg. or more at a wavelength of 600 nm or less shorter than that in claim 5 by constituting the alloy composition of the magnetooptic thin film as $Mn_xSb_yPt_z$ where x, y and z are specified by $45 \leq x \leq 55$, $42 \leq y \leq 45$, $3 \leq z \leq 10$ and $x+y+z=100$ (x, y and z designate proportions by atomic %). Therefore, the stable magnetooptic recording can be achieved at a shorter wavelength.

According to the present invention, the Kerr rotation angle ($\theta_k$) becomes 0.6 deg. or more at a shorter wavelength of 600 nm or less by constituting the alloy composition of the magnetooptic thin film as $Mn_xSb_yPt_z$ where x, y and z are specified by $48 \leq x \leq 53$, $42 \leq y \leq 45$, $4 \leq z \leq 8$ and $x+y+z=100$ (x, y and z designate proportions by atomic %). Accordingly, the magnetooptic thin film having a signal to noise ratio (S/N ratio) higher than those of the film recited in claim 5 and claim 6 is obtained.

According to the present invention, the internal stress of the magnetooptic thin film can be restrained to $1 \times 10^{-8}$ dyn/cm$^2$ and the wavelength $\lambda(\theta_k^{max})$ providing the maximum value of the Kerr rotation angle can be reduced to 550 nm or less by specifying the film thickness of the magnetooptic thin film to 20 nm or more and less than 100 nm. Accordingly, the magnetooptic thin film having higher long period reliability and capable of dealing with shorter wavelength recording can be obtained.

According to the present invention, the magnetooptic record medium having a high signal to noise ratio (S/N ratio) in a short wavelength band of 650 nm or less and having high long period reliability can be obtained with a thin film thickness by using in a record layer the magnetooptic thin film described in any one of the above embodiments.

According to the present invention, the internal stress of the magnetooptic thin film can be reduced even with the film thickness of the magnetooptic thin film of 50 nm or less by subjecting a substrate on which the magnetooptic thin film is to be formed to a heat treatment for 30 minutes or more at temperatures of 100° C. or more in a vacuum of $5 \times 10^{-6}$ Torr or less before forming the magnetooptic thin film. Accordingly, the magnetooptic thin film having a long period reliability can be made, even in the case where the film thickness of the magnetooptic thin film is 50 nm or less.

According to the present invention, the internal stress of the magnetooptic thin film can be reduced even with the film thickness of the magnetooptic thin film of 50 nm or less by subjecting the surface of a substrate on which the magnetooptic thin film is to be formed to a cleaning process by a high frequency wave sputtering process by using Ar gas having the impurity concentration of 10 ppb or less before forming the magnetooptic thin film. Therefore, the magnetooptic thin film having a long period reliability can be made even with the film thickness of the magnetooptic thin film of 50 nm or less.

According to the present invention, the $B8_1$ type crystalline structure is included in the alloy film forming the magnetooptic thin film by conducting a heat treatment of the magnetooptic thin film during formation or after formation of the magnetooptic thin film. As a result, the Kerr rotation angle ($\theta_k$) of the magnetooptic thin film can be increased. Therefore, the signal to noise ratio (S/N ratio) of the magnetooptic thin film is improved.

According to the present invention, the Kerr rotation angle ($\theta_k$) of the magnetooptic thin film can be made 0.4 deg. or more by specifying the heat treatment temperature of the magnetooptic thin film to 220° C. or more and 450° C. or less. Therefore, the signal to noise ratio (S/N ratio) of the magnetooptic thin film can further be improved.

According to the present invention, the Kerr rotation angle ($\theta_k$) of the magnetooptic thin film can be made 0.6 deg. or more by specifying the heat treatment temperature of the magnetooptic thin film to 260° C. or more and 400° C. or less. Accordingly, the signal to noise ratio (S/N ratio) of the magnetooptic thin film can further be improved.

Embodiment Examples

An explanation will be given of embodiment examples of the present invention as follows.

(Magnetooptic thin film)

As a magnetooptic thin film according to the present invention, for example, a MnSbPt alloy film formed on the surface of a glass substrate by a sputtering process, a vapor deposition process or the like is pointed out. A magnetooptic thin film needs to have a uniaxial anisotropy where an axis of easy magnetization is orthogonal to a face of forming a record layer. For that purpose, it is important that the magnetooptic thin film includes a crystalline structure of a hexagonal system having the uniaxial anisotropy. Further, it is preferable for manifesting magnetooptic characteristics that the crystalline structure of a hexagonal system is provided with a regular phase. Accordingly, it is preferable that the crystalline structure of the magnetooptic thin film is provided with at least a $B8_1$ type, mentioned later.

Further, the magnetooptic thin film according to the present invention can be used as a material of a record layer of a magnetooptic record medium, a magnetooptic element such as an optical isolator or the like by making good use of the above-mentioned characteristic. Incidentally, a substrate used in this case will be mentioned later.

Furthermore, according to the magnetooptic thin film of the present invention, the characteristic may be improved by an addition element effect, an underlayer effect or the like. As addition elements in this case, Al, Si, Ti, V, Cr, Fe, Ni, Cu, Zn, Ga, Ge, Zr, Nb, Mo, Ru, Re, Rh, Ag, In, Sn, Hf, Ta, W, Os, Ir, Au, Pb, Pd, Bi and the like are exemplified.

Or, a further improvement in the characteristic can also be achieved by forming a structure where other metal thin films, dielectric thin films and the MnSbPt alloy films are alternately laminated as a so-called magnetooptic record medium having an artificial lattice structure.

(Alloy composition of magnetooptic thin film)

As alloy compositions of magnetooptic thin films according to the present invention, three kinds of compounds of $Mn_xSb_yPt_z$ where $x+y+z=100$ (where x, y and z designate proportions in atomic %) indicated by Table 1, are pointed out. Incidentally, notation $\lambda(\theta_k^{max})$ designates a wavelength where $\theta_k$ is maximized. Further, $\theta_k$ is a Kerr rotation angle provided when the wavelength $\lambda$ is 528 nm.

TABLE 1

| Com-position Region | Alloy composition (atomic %) | | | Magnetooptic characteristics | $\theta_k$ |
|---|---|---|---|---|---|
| | X | Y | Z | $\lambda$ ($\theta_k^{max}$) | $\lambda$ = 528 nm |
| A | 45–56 | 40–48 | 2–15 | 650 nm or less | 0.4 deg. or more |
| B | 45–55 | 42–45 | 3–10 | 600 nm or less | 0.4 deg. or more |
| C | 48–53 | 42–45 | 4–7 | 600 nm or less | 0.6 deg. or more |

According to the composition region A, $\lambda(\theta_k^{max})$ becomes 650 nm or less and $\theta_k$ becomes 0.4 deg. or more. The result indicates that a larger $\theta_k$ is obtained in a wavelength band shorter than that of the conventional TbFeCo alloy film. Accordingly, a magnetooptic thin film capable of dealing with provision of a record density higher than the conventional one and having a higher signal to noise ratio (S/N ratio) can be realized.

Further, $\lambda(\theta_k^{max})$ becomes a shorter wavelength of 600 nm or less in the composition region B. Accordingly, a higher record density can be achieved since stable magnetooptic recording can be conducted at a wavelength shorter than that of the composition region A.

Furthermore, in the composition range C, $\lambda(\theta_k^{max})$ becomes 600 nm or less and $\theta_k$ becomes 0.6 deg. or more. Accordingly, a magnetooptic thin film having a signal to noise ratio (S/N ratio) significantly superior to that of the composition range B can be obtained.

(Crystalline structure of magnetooptic thin film)

As a crystalline structure of a magnetooptic thin film according to the present invention, for example, a structure comprising two phases of a $C_{1b}$ type and a $B8_1$ type is pointed out. In the case of the PtMnSb Whistler alloy film having a $C_{1b}$ type crystalline structure, four axes of symmetry are present since it is of a cubic crystal. Therefore, a plurality of axes of easy magnetization are present whereby the magnetic anisotropy is reduced. Meanwhile, in the case of the PtMnSb alloy film comprising the composition other than that of the Whistler alloy, although a crystalline structure of a hexagonal system having a uniaxial anisotropy was present, the crystalline structure was of an irregular phase and therefore, almost no magnetooptic characteristic was provided ($\theta_k$ is 0.1 deg. or less). That is, almost no magnetooptic effect has been manifested with an alloy film simply having the composition the same as that of the present invention, which is not suitable for the use of a record material or the like. However, after an intensive study on the film structure and the magnetooptic characteristic, it has been found that the PtMnSb alloy film of the present invention may have a crystalline structure having two phases of a $C_{1b}$ type crystalline structure added with a $B8_1$ type (NiAs type) crystalline structure that is one of crystalline structures of a hexagonal system having a uniaxial anisotropy by a heat treatment during formation of film or after formation of film, mentioned later. As a result, the PtMnSb alloy film of the present invention is provided with large magnetic anisotropy and excellent magnetooptic characteristic. Especially, as a condition of significantly achieving the effect, a crystalline structure where a ratio $\alpha/\beta$ of a diffraction intensity a from a (220)-plane of a $C_{1b}$ type crystalline structure to a diffraction intensity β from a (110)-plane of a $B8_1$ type crystalline structure in X-ray diffraction of the PtMnSb alloy film, is 0.05 or more and 1.0 or less, is accomplished. Further, when the ratio α/β is 0.1 or more, the magnetic anisotropy and the magnetooptic characteristic are further improved.

(Film thickness of magnetooptic thin film)

As the film thickness of a magnetooptic thin film according to the present invention, for example, that of 10 nm or more and less than 300 nm is accomplished. When the film thickness is 10 nm or more, the internal stress of the magnetooptic thin film becomes $5\times10^{-8}$ dyn/cm$^2$ or less and therefore, the adherence of the magnetooptic thin film in respect of a substrate or a protective film is improved and the long period reliability is promoted. Further, when the film thickness is 300 nm or less, the wavelength $\lambda(\theta_k^{max})$ whereby a maximum value of the Kerr rotation angle is provided, becomes 650 nmor less and therefore, a magnetooptic thin film capable of dealing with short wavelength recording is obtained. Further, when the film thickness of the magnetooptic thin film is 20 nm or more and less than 100 nm, the internal stress of the magnetooptic thin film becomes $1\times10^{-8}$ dyn/cm$^2$ or less and further, the wavelength $\lambda(\theta_k^{max})$ whereby a maximum value of the Kerr rotation angle is obtained, can be made 550 nm or less, which is further preferable.

(Heat treatment conducted on a substrate on which a magnetooptic thin film is to be formed before forming the magnetooptic thin film)

According to the present invention, as the "heat treatment conducted on a substrate on which a magnetooptic thin film is to be formed before forming the magnetooptic thin film" for example, a heat treatment at temperatures of 100° C. or more for 30 minutes or more in a vacuum of $5\times10^{-6}$ Torr or less, is accomplished. As a heat source for conducting the heat treatment, for example, a lamp heater, a sheath heater or the like is pertinently used. According to the magnetooptic thin film formed on the surface of a substrate subjected to the above-described heat treatment, the internal stress can be reduced compared with the case where the substrate has not been subjected to the heat treatment. The effect is considerable when the film thickness of the magnetooptic thin film is 100 nm or less. The evaluation of the internal stress is conducted by a mean stress of a thin film measured by X-ray diffraction method. The mean stress is defined by a numerical value produced by dividing a total stress S by a film thickness d when a stress per unit width of the film is defined as a total stress S, which is a mean value of the stress per unit area of the section of the film.

(Cleaning process conducted on a surface of a substrate on which a magnetooptic thin film is to be formed by a high frequency wave sputtering process before forming the optical thin film)

As the "cleaning process conducted on a surface of a substrate on which a magnetooptic thin film is to be formed by a high frequency wave sputtering process before forming the optical thin film" in accordance with the present invention, for example, a process using Ar gas having the impurity concentration of 10 ppb or less is pointed out. As impurities of Ar gas, for example, $H_2O$, $O_2$, $CO_2$, $H_2$, $N_2$, $C_xH_y$ and the like are accomplished. The impurity concentration is a value summing up $H_2O$, $O_2$ and $CO_2$. As the frequency of the high frequency wave sputtering process, 13.56 MHz or 2.45 GHz is preferably used. When the cleaning process is conducted by Ar gas having the low impurity concentration as described above, an effect similar to that of the above-described "heat treatment conducted on a substrate on which a magnetooptic thin film is to be formed before forming the magnetooptic thin film" is obtained. Also, the cleaning process is a low temperature process at 100° C. or less and is provided with a high effect of reducing adhesion of dust on the surface of a substrate before film formation. Accordingly, a magnetooptic thin film having excellent quality where an amount of incorporating dust is reduced can be formed.

(Substrate)

As a substrate, for example, glass, plastics, resins and composites of these and materials of these the surface of each of which is coated with a protective film by a sputtering process, a vapor deposition process, a plating process or the like, are accomplished. Especially, when a magnetooptic record medium is fabricated, a disk-shaped one is preferably used. The purposes of providing the protective film on the surface of a substrate, are prevention of emission gases from the substrate, prevention of invasion of alkaline ions from the substrate, provision of, for example, concentric rails on the surface of the substrate and the like. According to a general magnetooptic record medium, light for recording and reproducing information is incident on the magnetooptic thin film via the substrate and therefore, optical characteristics (reflectance, transmittance, refractive index, absorption coefficient and the like) of the above-described substrate and protective film are pertinently selected.

(Formation of a magnetooptic thin film)

With respect to formation of a magnetooptic thin film in accordance with the present invention, various processes of film formation such as sputtering, vacuum deposition, molecular beam epitaxy (MBE) and the like are accomplished. However, the present invention is not limited to these processes. Vaporization sources used here may be a MnSbPt alloy vaporization source or independent vaporization sources of respective elements. For example, when the film is formed by a sputtering process, whether an MnSbPt alloy target is used or a composite target where respective chips of Pt and Sb are mounted on a surface of an Mn target is constituted, is pertinently selected.

(Heat treatment of a magnetooptic thin film during formation or after formation of the magnetooptic thin film).

With respect to the "heat treatment of a magnetooptic thin film during formation or after formation of the magnetooptic thin film" in accordance with the present invention, for example, when the film is formed by a sputtering process, a heat treatment under an Ar gas atmosphere where the gas pressure is $5\times10^{-3}$ through $5\times10^{-2}$ Torr, is accomplished. When the heat treatment is conducted after the film formation, or the film is formed by a vacuum deposition process, for example, the process may be carried out in a vacuum of $5\times10^{-6}$ Torr or less. As the heat treatment temperature, temperatures of 220 through 450° C. whereby $\theta_k \geq 0.4$ is provided, is preferable. Further, when the heat treatment temperature is set to 260 through 400° C., it is further preferable since $\theta_k \geq 0.6$ can be realized.

BEST MODE FOR CARRYING OUT THE INVENTION

Figure 1:
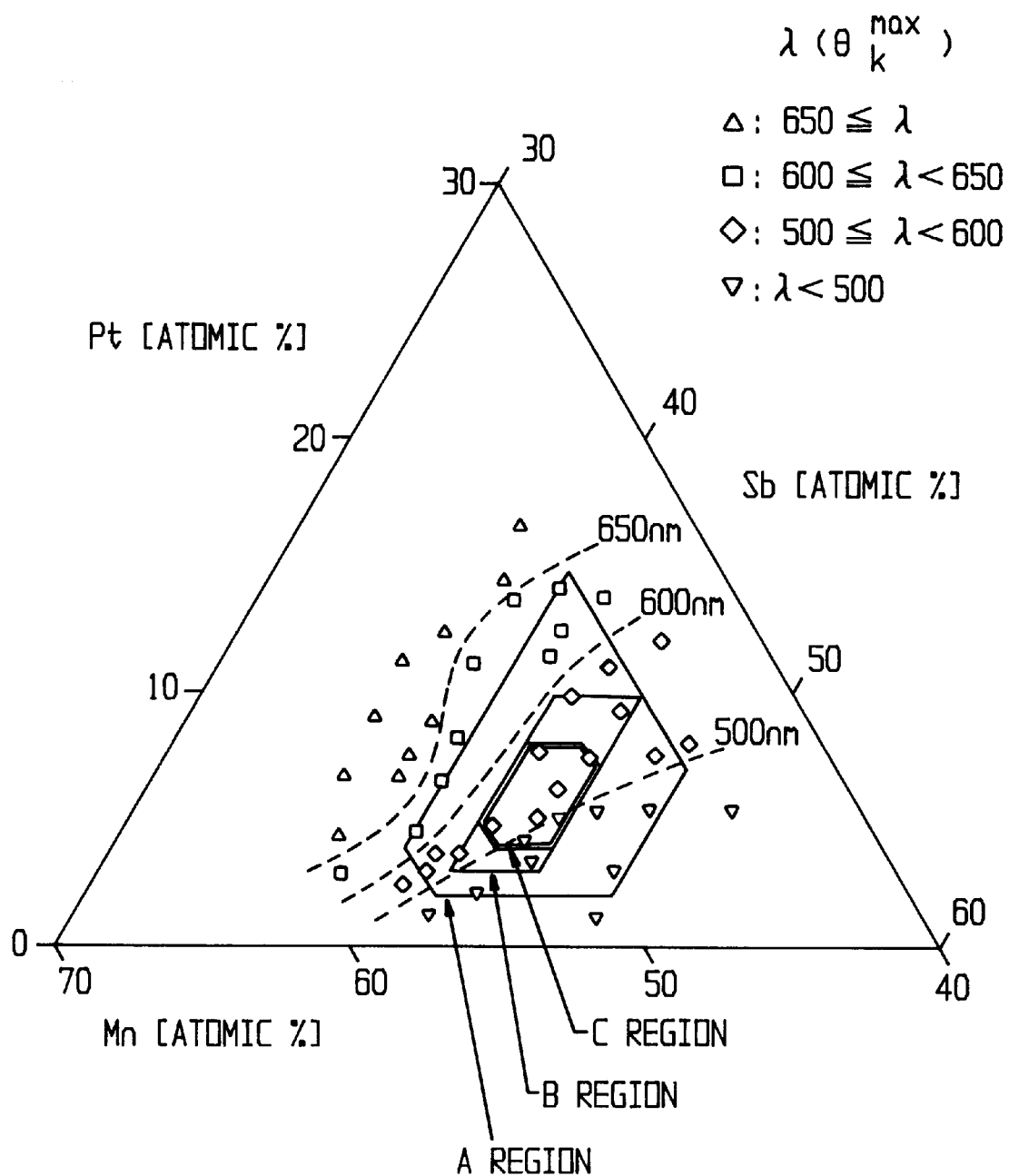
FIG. 1 is a graph showing a relationship between a composition of an MnSbPt alloy film according to Embodiment 1 and a wavelength $\lambda(\theta_k^{max})$ whereby a maximum value of a Kerr rotation angle is provided.

A more detailed explanation will be given of the present invention by showing embodiments as follows. However, the present invention are not limited to these embodiments.

(Embodiment 1)

According to this example, an effect of limiting an alloy composition of a magnetooptic thin film will be described with respect to a magnetooptic thin film which is a ternary alloy comprising manganese (Mn), antimony (Sb) and platinum (Pt). In order to confirm the effect, MnSbPt alloy films having various compositions are formed by the following fabrication method by using an RE magnetron sputtering device.

An explanation will be given of a method of preparing a magnetooptic thin film of this example in due steps as follows. The following bracketed numbers represent the steps.

(1) A glass substrate having a square of 8 mm and a thickness of 0.3 mm was used as a substrate. A glass substrate which had a shape of a parallel plate and where the surface was mirror-finished was used.

(2) A cleaning process by mechanical and chemical methods and a drying process by using a thermostatic tank were performed with respect to the substrate before film formation, mentioned later.

(3) The substrate which had been subjected to the drying process was set to a substrate holder made of aluminum and arranged in a preparatory chamber of a sputtering device. After exhausting the inside of the preparatory chamber to an ultimate degree of a vacuum of $5 \times 10^{-6}$ Torr by a vacuum exhaust device, the substrate temperature was maintained at 25° C. by a water cooling device attached to the substrate holder.

(4) The substrate holder was moved from the preparatory chamber to a film formation chamber 1 for preparing a MnSbPt alloy film. The substrate was maintained at the substrate temperature of 25° C. by the water cooling device attached to the substrate holder even after the movement. Incidentally, the film formation chamber 1 had previously been exhausted to an ultimate degree of a vacuum of $1 \times 10^{-7}$ Torr and after the movement of the substrate holder, a door valve disposed between the preparatory chamber and the film formation chamber 1 was closed. As a target, a composite target where a suitable amount of a Pt chip (in a fan-shaped sheet) was mounted on the surface of an MnSb alloy target (diameter; 4 inch), was used.

(5) Ar gas was introduced into the film formation chamber 1 and a gas pressure in the film formation chamber 1 was changed to 5 through 50 mTorr. The concentration of impurities included in used Ar gas is fixed to 1 ppm.

(6) A plasma was generated at the composite target described in (4) by adding a voltage of 300 W from an RF power source. As a result, the composite target was made to sputter and an MnSbPt alloy film having the film thickness of 300 nm was formed on the surface of the substrate disposed in parallel to the opposed target.

(7) After the MnSbPt alloy film had been formed, the substrate holder was moved from the film formation chamber 1 to a film formation chamber 2 for forming an $SiO_2$ film. The substrate was maintained at the substrate temperature of 25° C. by the water cooling device attached to the substrate holder even after the movement. Incidentally, the film formation chamber 2 had previously been exhausted to an ultimate degree of a vacuum of $1 \times 10^{-7}$ Torr and a door valve disposed between the film formation chamber 1 and the film formation chamber 2 was closed after the movement of the substrate holder. The target used was made of $SiO_2$.

(8) Ar gas was introduced into the film formation chamber 2 whereby the gas pressure of the film formation chamber was changed to 10 mTorr. The concentration of impurities included in used Ar gas was fixed to 1 ppm.

(9) A voltage of 200 W was applied from an RF power source to the $SiO_2$ target whereby a plasma was generated. As a result, the $SiO_2$ target was made to sputter whereby an $SiO_2$ film having the film thickness of 40 nm was formed on the surface of the substrate coated with the MnSbPt alloy film disposed parallel to the opposed target.

(10) After the $SiO_2$ film had been formed, the substrate holder was moved from the film formation chamber 2 to a discharge chamber. Thereafter, $N_2$ gas was introduced into the discharge chamber whereby the pressure was changed to an atmospheric pressure and thereafter, the substrate was discharged. A magnetooptic thin film having the layer constitution of $SiO_2$/MnSbPt/glass had been prepared by the steps of (1) through (9).

(11) The magnetooptic thin film prepared by the above-described step of (10) was subjected to a heat treatment at 300° C. for 10 hours in a vacuum of $5 \times 10^{-6}$ Torr.

The composition of the MnSbPt alloy film prepared after the steps of (1) through (11) was determined by the Electron Probe Microanalysis (EPMA) method. The crystalline structure of the thin film was determined by X-ray diffraction method. Further, the Kerr rotation angle $\theta_k$ was measured by a polarization plane modulating process Kerr spectra measuring device in a range of wavelength $\lambda$ of 400 through 1000 nm. Furthermore, the saturation magnetization Ms was measured by a vibration sample type magnetic force meter (VSM).

Figure 2:
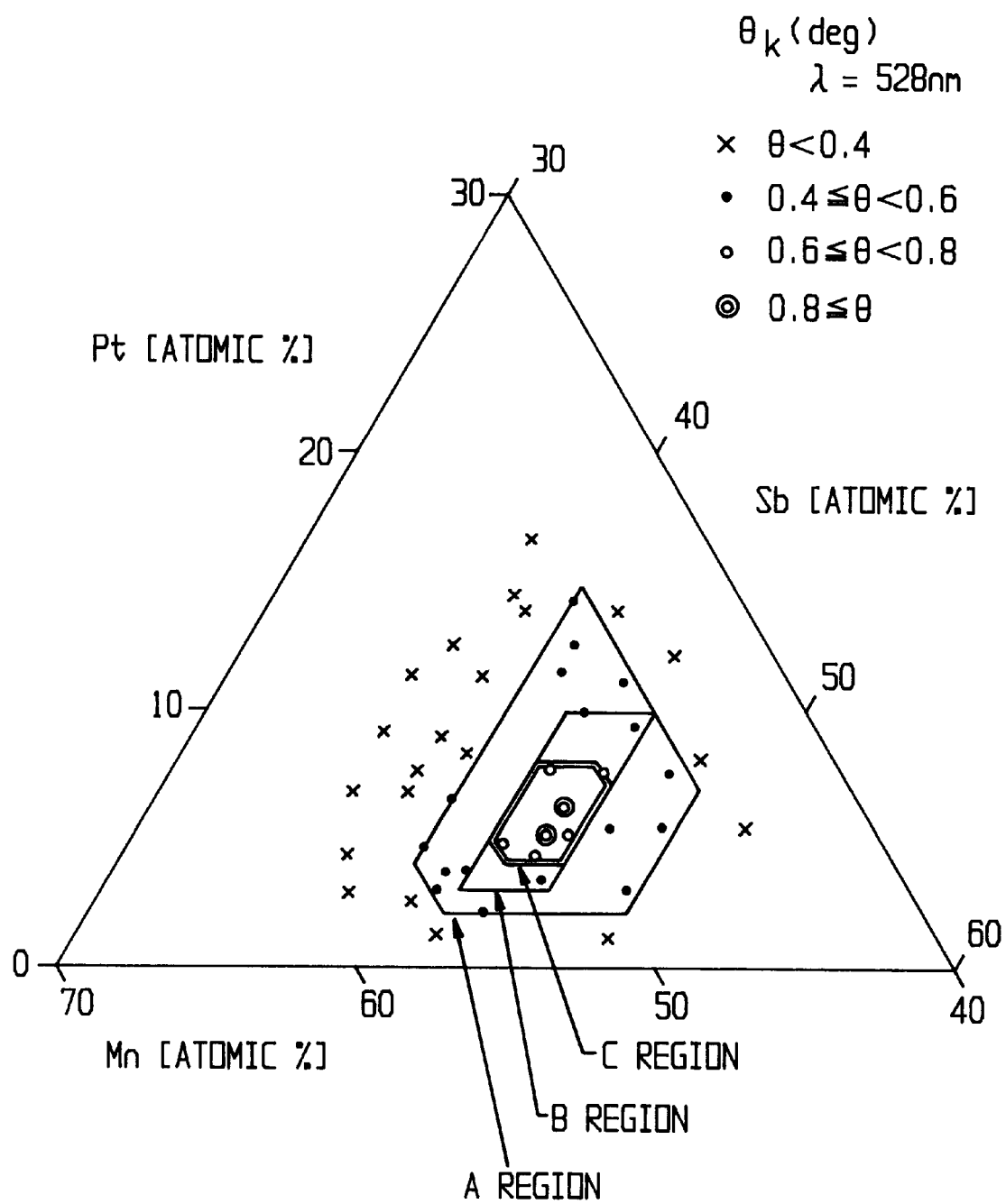
FIG. 2 is a graph showing a relationship between a composition of an MnSbPt alloy film according to Embodiment 1 and a Kerr rotation angle $\theta_k$ measured when the wavelength is 528 nm.

FIG. 1 and FIG. 2 are graphs showing the composition (unit of atomic %) of the MnSbPt alloy film prepared after subjecting to the steps of (1) through (11). Incidentally, this is a result when the film thickness of the MnSbPt alloy film was fixed to 300 nm. In each of FIG. 1 and FIG. 2, the base designates a graduation axis of a proportion of Mn (left end designates 70 atomic %, right end designates 40 atomic %) the left oblique side designates a graduation axis of a proportion of Pt (upper end designates 30 atomic %, lower end designates 0 atomic %) and the right oblique side designates a graduation axis of a proportion of Sb (upper end designates 30 atomic %, lower end designates 70 atomic %).

Notations used in FIG. 1 designate differences in wavelengths $\lambda(\theta_k^{max})$ [unit; nm] whereby maximum values of the Kerr rotation angles can be provided where $\Delta$ marks designate $\lambda(\theta_k^{max}) \geq 650$, $\triangledown$ marks designate $650 > \lambda(\theta_k^{max}) \geq 600$, $\diamond$ marks designate $600 > \lambda(\theta_k^{max}) \geq 500$ and ▼ marks designate $\lambda(\theta_k^{max}) < 500$.

Notations used in FIG. 2 designate values of the Kerr rotation angles $\theta_k$ [unit; deg.] measured when the wavelength was 528 nm where the X marks designate $\theta_k < 0.4$, ● marks designate $0.4 \leq \theta_k < 0.6$, ○ marks designate $0.6 \leq \theta_k < 0.8$ and ⊙ marks designate $\theta_k \geq 0.8$.

The regions A through C shown in FIG. 1 and FIG. 2 are ranges shown in the above-described Table 1 and these correspond to ranges specified in claims 1, 2 and 3.

Further, dotted lines shown in FIG. 1 represent contour lines of $\lambda(\theta_k^{max})$.

It was found from FIG. 1 and FIG. 2 that the thin film having the composition of the region A was provided with $\lambda(\theta_k^{max})$ of 650 nm or less and $\theta_k$ of 0.4 or more. Further, it was found that the thin film having the composition of the region B was provided with $\lambda(\theta_k^{max})$ of 600 nm or less and $\theta_k$ of 0.4 or more. Furthermore, it was found that the thin film having the composition of the region C was provided with $\lambda(\theta_k^{max})$ of 600 nm or less and $\theta_k$ of 0.6 or more.

Figure 3A:
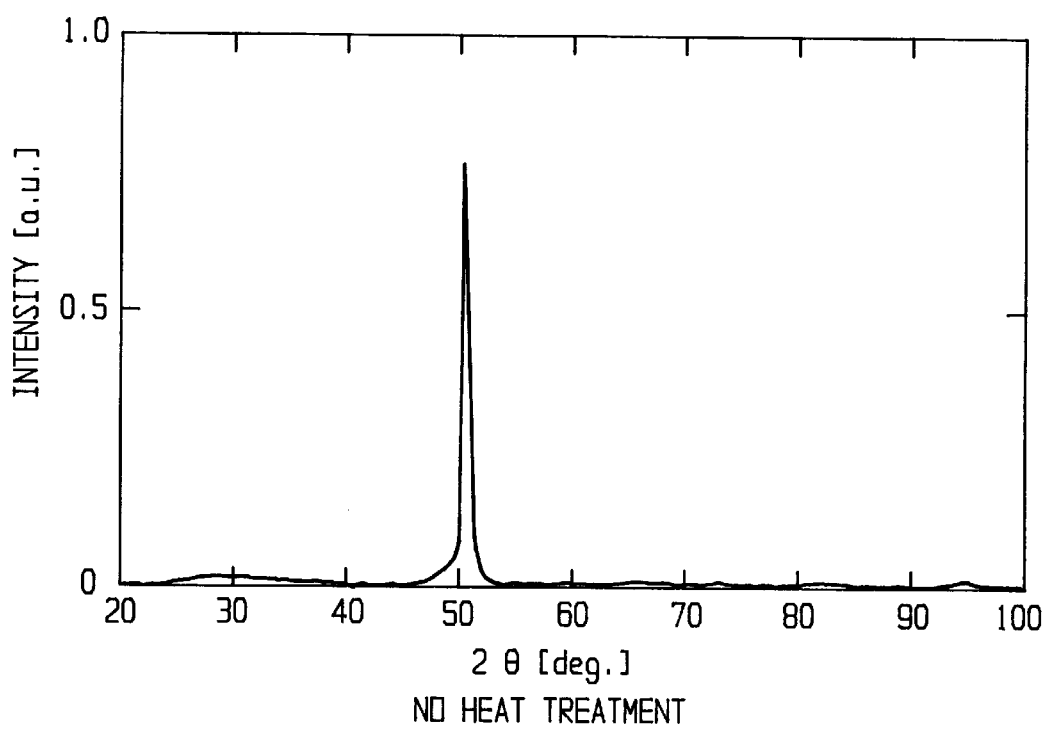
FIG. 3 are results of investigating by X-ray diffraction method a difference between film structures owing to the presence or absence of heat treatment after film formation with respect to the MnSbPt alloy film according to Embodiment 1.
Figure 3B:
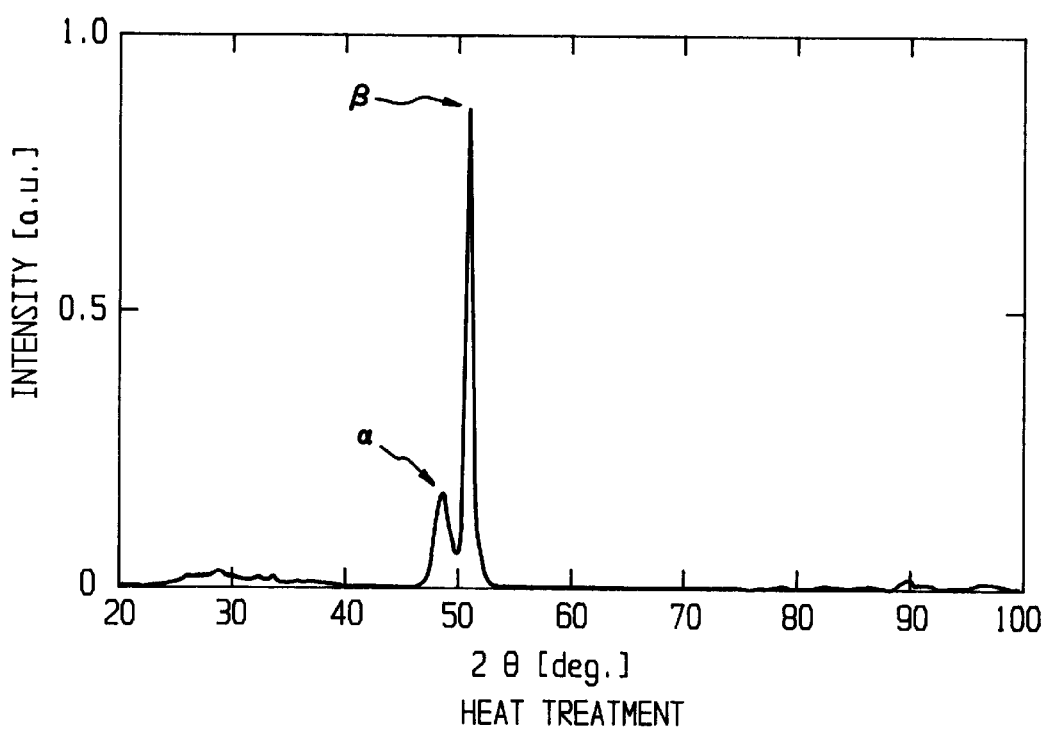

FIG. 3 shows a result of an investigation through X-ray diffraction method with respect to a difference in the film structure due to presence or absence of the step of (11), that is, the heat treatment after film formation. Incidentally, the composition of the magnetooptic thin film was fixed to $Mn_{50}Sb_{44}Pt_6$. As a result, it was found that according to the case where the heat treatment was dispensed with (FIG. 3(a)) the crystalline structure of the magnetooptic thin film was provided with a profile of a hexagonal system where the crystalline structure was not regulated. Meanwhile, according to the case where the heat treatment was conducted (FIG. 3(b)), the crystalline structure of the magnetooptic thin film comprised two phases of a $C_{1b}$ type and a $B8_1$ type.

Figure 4:
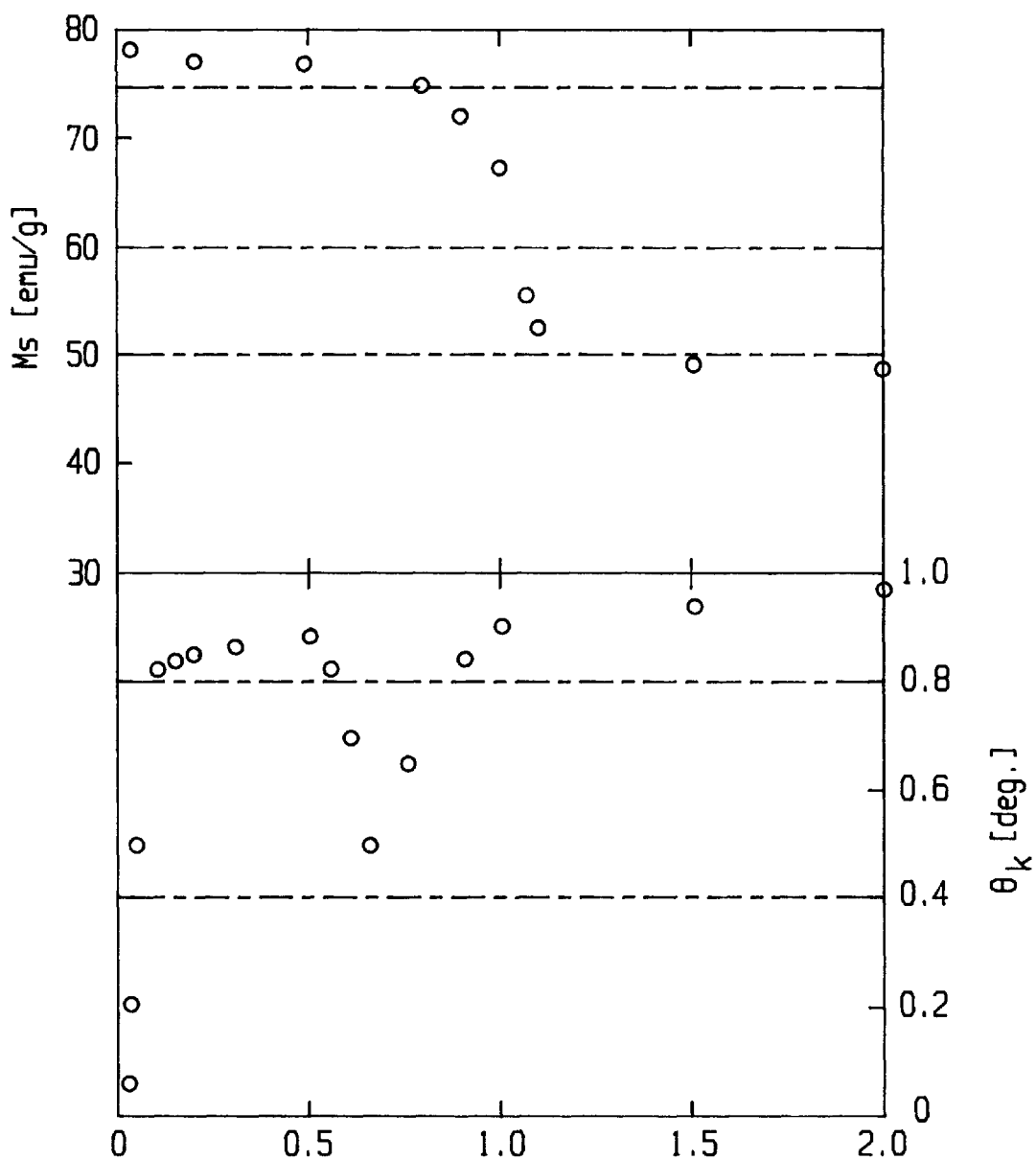
FIG. 4 is a graph with respect to the MnSbPt alloy film according to Embodiment 1 where a ratio $\alpha/\beta$ of a diffraction intensity a from a (220)-plane of a $C_{1b}$ type crystalline structure to a diffraction intensity $\beta$ from a (110)-plane of a $B8_1$ type crystalline structure in X-ray diffraction of the alloy film, is designated by the abscissa and a saturation magnetization Ms and a Kerr rotation angle $\theta_k$ measured when the wavelength is 528 nm are designated by the ordinate.

FIG. 4 is a graph summarized by designating a ratio $\alpha/\beta$ of a diffraction intensity $\alpha$ from a (220)-plane of a $C_{1b}$ type crystalline structure to a diffraction intensity $\beta$ from a (110)-plane of a $B8_1$ type crystalline structure in X-ray diffraction of the MnSbPt alloy film as the abscissa and a saturation magnetization Ms of the MnSbPt alloy film and a Kerr rotation angle $\theta_k$ thereof measured when the wavelength is 528 nm as the ordinate. Incidentally, the thin film samples comprising various compositions which have been subjected to the step of (11) were used as the MnSbPt alloy films. As a result, it was found that there were provided the magnetooptic thin films having the saturation magnetization in a direction orthogonal to the film face of 60 emu/g or more (a value higher than that of the conventional Whistler alloy film (<50 emu/g) by 20% or more) and $\theta_k$ of 0.4 deg. or more attained when the wavelength was 528 nm, in the case where $\alpha/\beta$ was 0.05 or more and 1.0 or less. Further, it was found that the magnetooptic thin films were provided with larger values of the magnetic anisotropy and the magnetooptic characteristic, or the saturation magnetization in the direction orthogonal to the film face of 75 emu/g or more (a value higher than that of the conventional Whistler alloy film (<50 emu/g) by 50% or more) and $\theta_k$ of 0.8 deg. or more attained when the wavelength was 528 nm in the case where $\alpha/\beta$ was 0.1 or more and 0.55 or less.

(Embodiment 2)

This example is different from Embodiment 1 in that the MnSbPt alloy films were prepared by changing the film thickness in a range of 2.5 through 500 nm.

The other points are similar to those in Embodiment 1.

Figure 5:
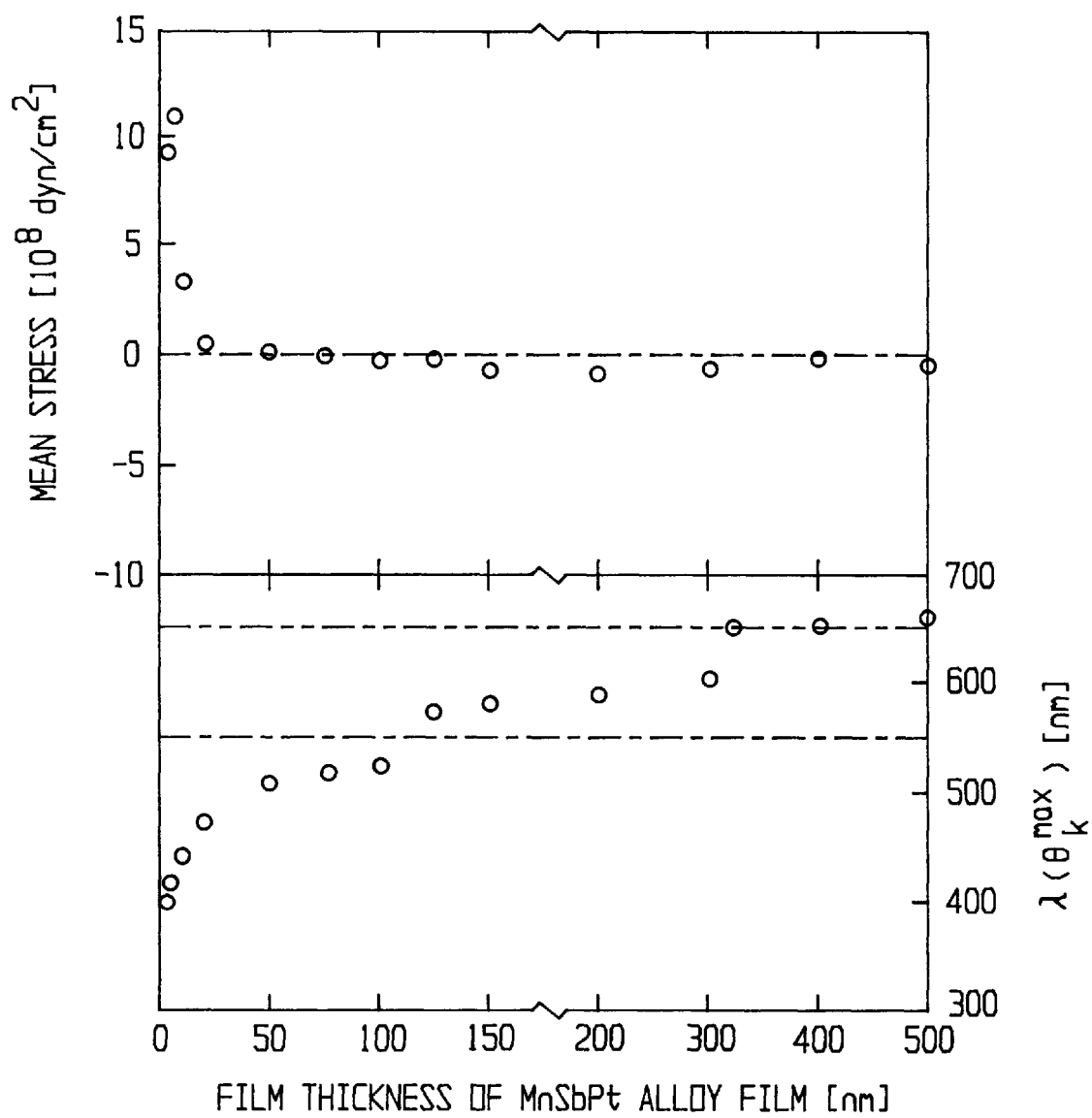
FIG. 5 is a graph with respect to an MnSbPt alloy film according to Embodiment 2, where the film thickness of the alloy film is designated by the abscissa and an internal stress (mean stress) and a wavelength $\lambda(\theta_k^{max})$ whereby a maximum value of a Kerr rotation angle is provided, are designated by the ordinate.

FIG. 5 shows observation results of the internal stresses (mean stress) and the wavelengths $\lambda(\theta_k^{max})$ where the maximum values of the Kerr rotation angles were obtained in respect of the MnSbPt alloy films. However, only the internal stresses of the thin films were measured through X-ray diffraction method by using samples with no provision of the $SiO_2$ films, that is, the magnetooptic thin films having the layer constitution of MnSbPt/glass.

According to this example, it was found that the internal stresses which became problematic with the film thickness of lower than 10 nm could be halved and $\lambda(\theta_k^{max})$ could be reduced to 650 nm or less by limiting the film thicknesses of the MnSbPt alloy films to a range of 10 through 300 nm. Further, it was found that the internal stresses were further reduced, the film thickness dependency could be dispensed with and $\lambda(\theta_k^{max})$ could be reduced to 550 nm or less when the film thicknesses were limited to a range of 20 through 100 nm.

It was found from the results of the above-described Embodiment 1 and Embodiment 2 that the magnetooptic record medium using the MnSbPt alloy films for the record layer, could record and reproduce by a wavelength shorter than that of the conventional medium where the TbFeCo alloy film or the like was a record layer and a signal to noise ratio (S/N ratio) higher than that of the conventional medium could be realized. Also, it was determined that the long period reliability was high since the internal stress could be maintained to a small value in the film thickness range of 300 nm or less. Additionally, the magnetooptic record medium can be manufactured at a lower cost since the amount of using Pt, which is an expensive noble metal, can be reduced because the excellent characteristics were confirmed with a thin film thickness.

(Embodiment 3)

According to this example, effects of a heat treatment (abbreviated as H treatment) and a cleaning process (abbreviated as C process) which were conducted on substrates on which the MnSbPt alloy films were formed before forming the MnSbPt alloy films. The H treatment was carried out as a heat treatment at temperatures of 100° C. or more for 30 minutes or more in a vacuum of $5 \times 10^{-6}$ Torr. Further, the C process was carried out as a cleaning process by a high frequency wave sputtering process using Ar gas having the impurity concentration of 10 ppb or less. n order to investigate the internal stresses of the MnSbPt alloy films, samples having no $SiO_2$ film, that is, the magnetooptic thin films having the layer constitution of MnSbPt/glass were used. The film composition was limited to $Mn_{50}Sb_{44}Pt_6$. Further, the MnSbPt alloy films were prepared by changing the film thicknesses thereof in a range of 2.5 through 100 nm.

The other points were similar to those in Embodiment 1.

Figure 6:
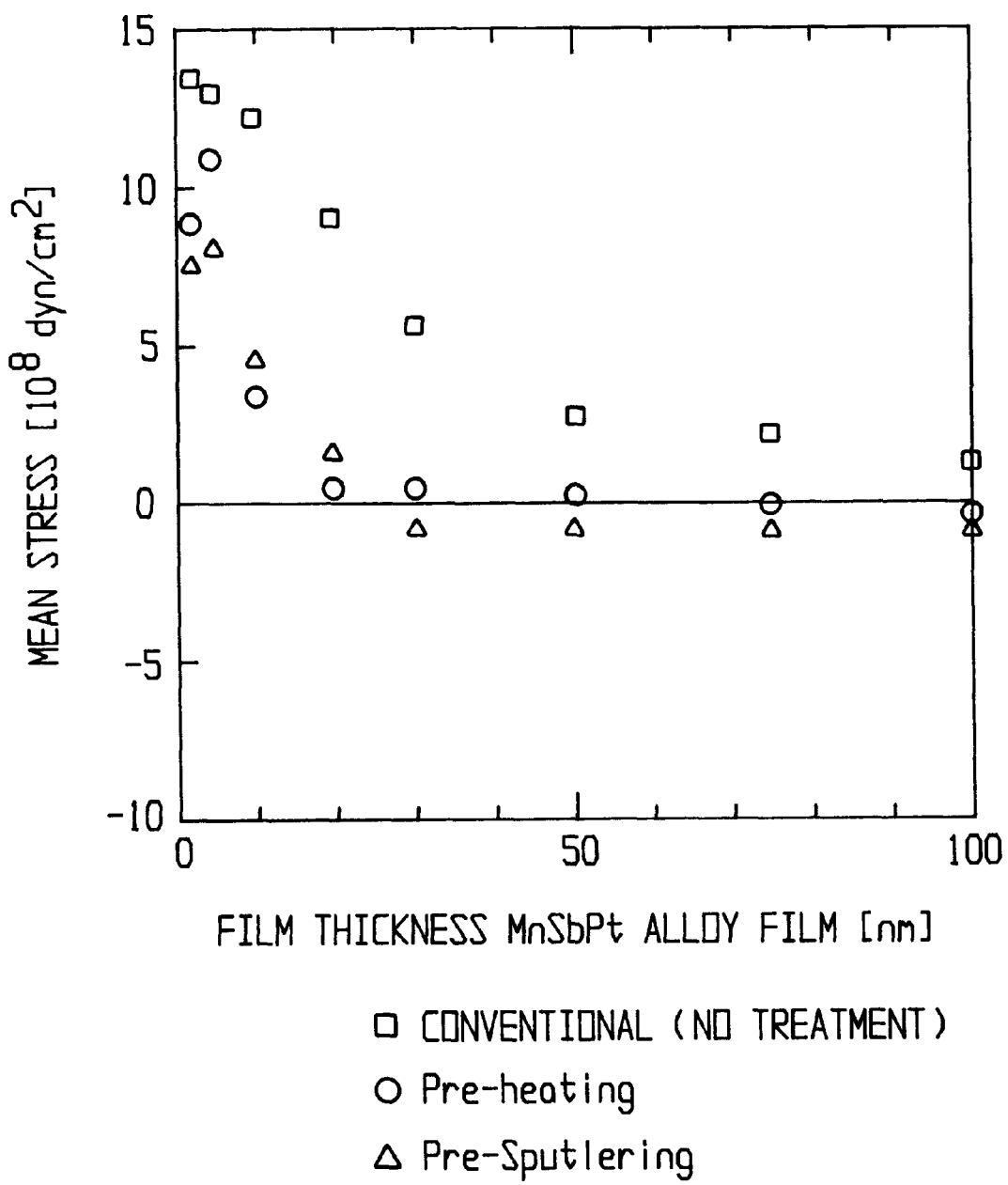
FIG. 6 is a graph showing a relationship between a film thickness of an MnSbPt alloy film according to Embodiment 3 and an internal stress (mean stress).

FIG. 6 shows observation results of the internal stresses (mean stress) of the MnSbPt alloy films. The cases where the MnSbPt alloy films were prepared without carrying out the H treatment or the C process of this example (abbreviated as N treatment) were shown as conventional examples. □ marks designate the N treatment, ○ marks designate the H treatment and A marks designate the C process.

It was found that smaller internal stresses could be realized with the film thickness range thinner than that of the conventional examples by carrying out the H treatment or the C process.

Incidentally, it was confirmed separately that the above-described effects became unstable when one or more of cases of (a) degree of vacuum >5×10$^{-6}$ Torr, (b) temperature <100° C. and (c) time <30 minutes were included or when Ar gas having the impurity concentration of 10 ppb or higher was used in respect of the conditions of the C process.

(Embodiment 4)

According to the example, an effect of the heat treatment (abbreviated as A treatment) that was carried out with respect to the MnSbPt alloy films after forming the MnSbPt alloy films, was investigated. The A treatment was a heat treatment that was conducted for 10 hours in a vacuum of 5×10$^{-6}$ Torr or less. However, the films were prepared by changing the temperatures of the A treatment in a range of 25 (no heating) through 500° C. The film composition was fixed to Mn$^{50}$Sb$^{44}$Pt$^{6}$. Also, the film thickness of the MnSbPt alloy films was 100 nm.

The other points were similar to those in Embodiment 1.

Figure 7:
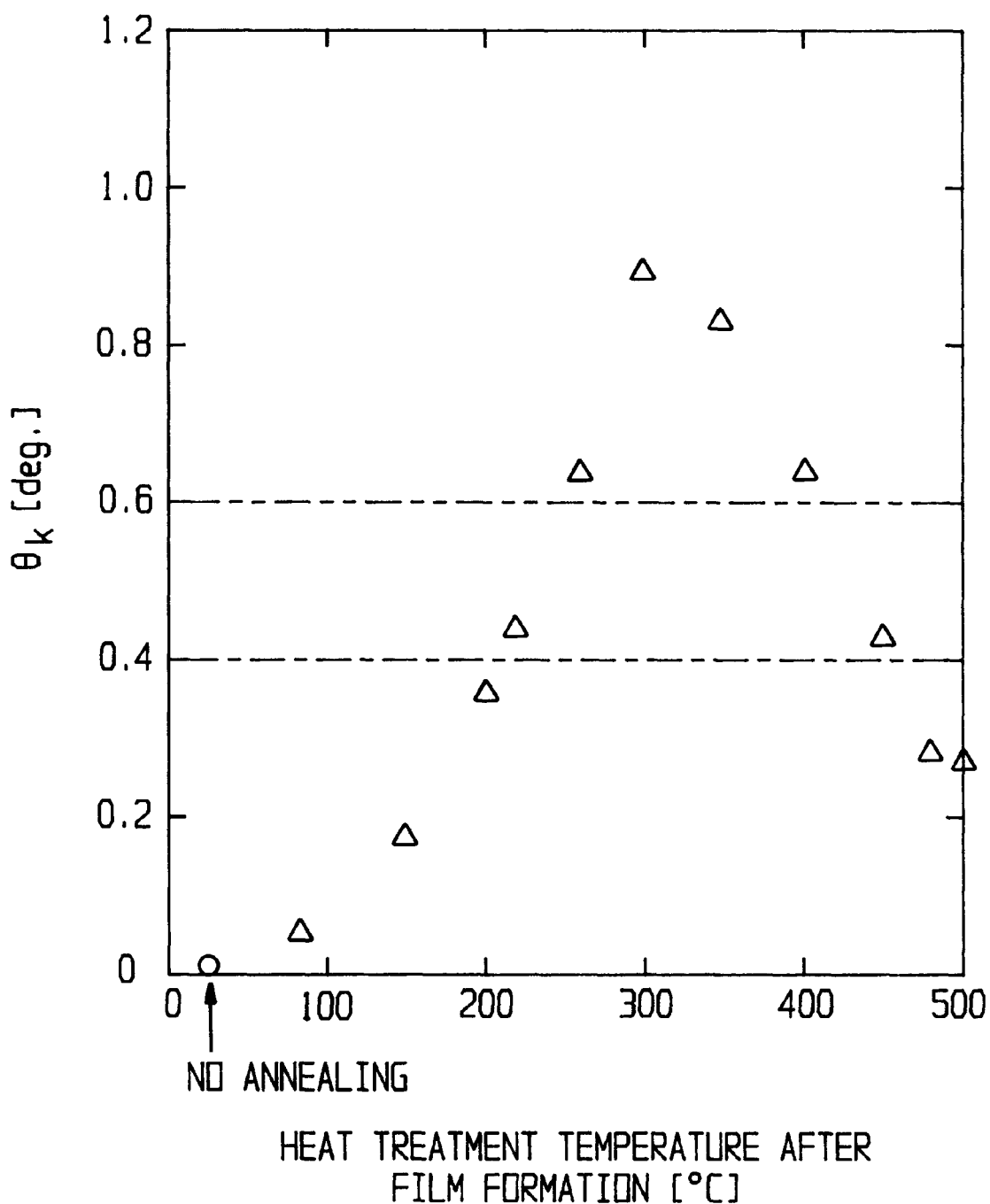
FIG. 7 is a graph showing a relationship between a heat treatment temperature after film formation and a Kerr rotation angle $\theta_k$ measured when the wavelength is 528 nm with respect to an MnSbPt alloy film according to Embodiment 4.

FIG. 7 shows observation results of the Kerr rotation angles $\theta_k$ [unit; deg.] of the MnSbPt alloy films. The Kerr rotation angles $\theta_k$ were values measured when the wavelength was 528 nm.

According to this example, it was found that a large $\theta_k$ was obtained by carrying out the A treatment. Further, $\theta_k \geq 0.4$ could be realized in a range of temperatures of the A treatment of 220 through 450° C. and $\theta_k \geq 0.6$ could be realized in a range of 260 through 400° C.

Incidentally, it was separately confirmed that effects similar to those of the case where the film had already been formed were achieved when the heat treatment was conducted during the film formation, that is, under the film forming atmosphere.

Industrial Applicability

As has been explained, according to the inventions specified in claims 1 through 4 and the above embodiments, a magnetooptic thin film having a high signal to noise ratio (S/N ratio) in a short wavelength band and large vertical magnetic anisotropy, can be obtained.

An inexpensive magnetooptic thin film having long period reliability can be obtained by the inventions specified in claims 5 through 8. Further, a magnetooptic record medium enabling a high record density can be obtained according to the inventions specified by claim 9. Furthermore, according to the inventions specified by claim 10 or 11, a method of making an inexpensive magnetooptic thin film capable of thinning a record layer comprising a magnetooptic thin film can be obtained.

According to the inventions specified by claims 12 through 14, there is provided a method of making a magnetooptic thin film where short wavelength recording is feasible and long period reliability is provided.

What is claimed is:

1. A magnetooptic thin film characterized in that in a magnetooptic thin film that is a ternary alloy comprising manganese (Mn), antimony (Sb) and platinum (Pt), an alloy composition of the magnetooptic thin film is Mn$_x$Sb$_y$Pt$_z$ where $45 \leq x \leq 56$, $40 \leq y \leq 48$, $2 \leq z \leq 15$ and $x+y+z=100$ (where x, y and z designate proportions by atomic %) and a ratio $\alpha/\beta$ of a diffraction intensity $\alpha$ from a (220)-plane of a C$_{1b}$ crystalline structure to a diffraction intensity $\beta$ from a (110)-plane of a B8$_1$ crystalline structure in X-ray diffraction of the magnetooptic thin film is 0.05 or more and 1.0 or less.

2. The magnetooptic thin film according to claim 1 characterized in that the alloy composition of the magnetooptic thin film is Mn$_x$Sb$_y$Pt$_z$ where $45 \leq x \leq 55$, $42 \leq y \leq 45$, $3 \leq z \leq 10$ and $x+y+z=100$ (where x, y and z designate proportions in atomic %).

3. The magnetooptic thin film according to claim 1 or 2 characterized in that the alloy composition of the magnetooptic thin film is Mn$_x$Sb$_y$Pt$_z$ where $48 \leq x \leq +53$, $42 \leq y \leq 45$, $4 \leq z \leq 8$ and $x+y+z=100$ (where x, y and z designate proportions by atomic %).

4. The magnetooptic thin film according to any one of claims 1 through 2, characterized in that the ratio $\alpha/\beta$ of the diffraction intensity $\alpha$ from the (220)-plane of the C$_{1b}$ crystalline structure to the diffraction intensity $\beta$ from the (110)-plane of the B8$_1$ crystalline structure in X-ray diffraction of the magnetooptic thin film is 0.1 or more and 0.55 or less.

5. A magnetooptic thin film characterized in that in a magnetooptic thin film that is a ternary alloy comprising manganese (Mn), antimony (Sb) and platinum (Pt), an alloy composition of the magnetooptic thin film is Mn$_x$Sb$_y$Pt$_z$ where $45 \leq x \leq 56$, $40 \leq y \leq 48$, $2 \leq z \leq 15$ and $x+y+z=100$ (where x, y and z designate proportions in atomic %) and a film thickness of the magnetooptic thin film is 10 nm or more and less than 100 nm.

6. The magnetooptic thin film according to claim 5 characterized in that the alloy composition of the magnetooptic thin film is Mn$_x$Sb$_y$Pt$_z$ where $45 \leq x \leq 55$, $42 \leq y \leq 45$, $3 \leq z \leq 10$ and $x+y+z=100$ (where x, y and z designate proportions in atomic %).

7. The magnetooptic thin film according to claim 5 or 6 characterized in that the alloy composition of the magnetooptic thin film is Mn$_x$Sb$_y$Pt$_z$ where $48 \leq x \leq 53$, $42 \leq y \leq 45$, $4 \leq z \leq 8$ and $x+y+z=100$ (where x, y and z designate proportions in atomic %).

8. The magnetooptic thin film according to any one of claim 5 or 6 characterized in that the film thickness of the magnetooptic thin film is 20 nm or more and less than 100 nm.

9. A magnetooptic record medium characterized in that the magnetooptic thin film according to claim 1 or 2 is used for a record layer.

10. A method of making a magnetooptic thin film characterized in that in a method of making the magnetooptic thin film according to claim 1 or 2, by sputtering a target, a heat treatment conducted in respect of a substrate on which the magnetooptic thin film is to be formed before forming the magnetooptic thin film is carried out in a vacuum of 5×10$^{-6}$ Torr or less at temperatures of 100° C. or more for 30 minutes.

11. A method of making a magnetooptic thin film characterized in that in a method of making the magnetooptic thin film according to claim 1 or 2, by sputtering a target, a cleaning process conducted by a high frequency wave sputtering process in respect of a surface of a substrate on which the magnetooptic thin film is to be formed before forming the magnetooptic thin film uses Ar gas having an impurity concentration of 10 P.B. or less.

12. The method of making a magnetooptic thin film according to claim 10 characterized in that a heat treatment of the magnetooptic thin film is carried out during formation or after formation of the magnetooptic thin film.

13. The method of making a magnetooptic thin film according to claim 10 characterized in that a temperature of the heat treatment is 220° C. or more and 450° C. or less.

14. The method of making a magnetooptic thin film according to claim 10 characterized in that the heat treatment is carried out at 260° C. or more and 400° C. or less.

15. A magnetooptic thin film according to claim 5 characterized in that the film is formed by sputtering a target.

16. A magnetooptic thin film according to claim 15 characterized in that the target has an alloy composition of $Mn_xSb_yPt_z$ where $45 \leq x \leq 56$, $40 \leq y \leq 48$, $2 \leq z \leq 15$ and $x+y+z=100$ (where x, y and z designate proportions by atomic %).

17. A magnetooptic thin film according to claim 6 characterized in that the film is formed by sputtering a target.

18. A magnetooptic thin film according to claim 17 characterized in that the target has an alloy composition of $Mn_xSb_yPt_z$ where $45 \leq x \leq 55$, $42 \leq y \leq 45$, $3 \leq z \leq 10$ and $x+y+z=100$ (where x, y and z designate proportions by atomic %).

19. A magnetooptic thin film according to claim 1 wherein the Kerr rotation angle at the wavelength less than 550 is more than 0.6 degrees.

20. A method of making a magnetooptic thin film according to claim 10 characterized in that the target has an alloy composition of $Mn_xSb_yPt_z$ where $45 \leq x \leq 56$, $40 \leq y \leq 48$, $2 \leq z \leq 15$ and $x+y+z=100$ (where x, y and z designate proportions by atomic %).

21. A method of making a magnetooptic thin film according to claim 10 characterized in that the target has an alloy composition of $Mn_xSb_yPt_z$ where $45 \leq x \leq 55$, $42 \leq y \leq 45$, $3 \leq z \leq 10$ and $x+y+z=100$ (where x, y and z designate proportions by atomic %).

* * * * *

UNITED STATES PATENT AND TRADEMARK OFFICE
CERTIFICATE OF CORRECTION

PATENT NO.    : 6,190,763 B1
DATED         : February 20, 2001
INVENTOR(S)   : Migaku Takahashi It is certified that error appears in the above-identified patent and that said Letters Patent is hereby corrected as shown below:

On the Title Page, Item [54], "MAGNETOOPTIC THIN FILM, MAGNETOOPIC RECORD MEDIUM" should read ----MAGNETOOPTIC THIN FILM, MAGNETOOPTIC RECORD MEDIUM ----.

On the Title Page, Item [57], magnetooptic thin film is to be formed, is heat-treated on a" should read ----Magnetooptic thin film is to be formed, is heat-treated in a----.

Signed and Sealed this

Twelfth Day of June, 2001

*Attest:*

*Attesting Officer*

NICHOLAS P. GODICI
*Acting Director of the United States Patent and Trademark Office*